United States Patent [19]

Ju et al.

[11] Patent Number: 5,777,803
[45] Date of Patent: Jul. 7, 1998

[54] OBJECTIVE LENS FOR OPTICAL PICK-UP HEAD OF OPTICAL DISK DRIVE

[75] Inventors: Jau-Jiu Ju, Hsinchu; Tsung-Ming Yang, Chilong; Tsung-Kai Chang, Hsinchu, all of Taiwan

[73] Assignee: Industrial Technology Research Institute, Hsinchu, Taiwan

[21] Appl. No.: 605,915

[22] Filed: Feb. 23, 1996

[51] Int. Cl.$^6$ .............................. G02B 13/18; G02B 3/08
[52] U.S. Cl. ........................ 359/719; 359/742; 359/743
[58] Field of Search ................................. 359/718, 719, 359/742, 743

[56] References Cited

U.S. PATENT DOCUMENTS 5,153,778  10/1992  Sasian-Alvarado ............. 359/743

Primary Examiner—Scott J. Sugarman
Attorney, Agent, or Firm—Oppenheimer Wolff & Donnelly LLP

[57] ABSTRACT

An objective lens for an optical disk drive is disclosed. The objective lens comprises four portions each having a aspherical surface for focusing a light beam of a designated wavelength to a designated focal point. The first portion has a first aspherical surface that focuses the light beam to a first focal point. The second portion has a second aspherical surface that focuses the light beam to a second focal point. The third portion has a third aspherical surface featuring the same surface curvature characteristics as that of the first aspherical surface and focuses the light beam to the first focal point. And, the fourth portion has a fourth aspherical surface featuring the same surface curvature characteristics as that of the second aspherical surface and focuses the light beam to the second focal point. The objective lens can be made as a single-piece lens that suffers no energy loss for either focusing.

20 Claims, 10 Drawing Sheets

OBJECTIVE LENS FOR OPTICAL PICK-UP HEAD OF OPTICAL DISK DRIVE

BACKGROUND OF THE INVENTION

1. Field of the Invention

This invention relates in general to objective lens for optical pick-up head of compact disk drive devices. In particular, the present invention relates to objective lens for optical pick-up head of compact disk drive device capable of reading high density disks having multiple data layers by dual-focal lens set.

2. Description of Related Art

Optical disks, in particular, Compact Disc (CD) originated by Philips Corporation of Netherlands and Sony Corporation of Japan in the 1970s, have now evolved into a category of various information storage devices that are widely used for the storage of digital information ranging from audio, video and any other text or graphical information retrievable by digital computer systems. The original audio CD and its direct descendants and derivatives, such as the CD-ROM for computer data storage, CD-I of an interactive multimedia program standard, VCD for video program storage, as well as those SDCD (super density compact disc) and DVD (digital video disc) still under development, are all characterized by several distinguished aspects that are vital for efficient information storage and retrieval. These include the digital storage, error correction scheme, and disc longevity.

Among their diversified applications, optical disks have found particular acceptance in the microprocessor-based home and office computer systems for popular applications including large capacity storage of computer program and data, as well as storage media for multimedia programs. While advancements in digital signal processing technology, which include the development and establishment of digital data compression standards as well as price reductions in CD-ROM drives for personal computers, have increased the popularity of these optical disk devices, their popularity has in turn promoted the trend in the development of even higher-capacity optical disk equipment.

To facilitate the storage of digital data in optical disks with higher storage density means higher optical resolution will have to be achieved in the devices handling the read/write accesses of these optical disks. Optical resolution is directly dependent on factors including the wavelength of the light used for disk data access as well as the numerical aperture of the objective lens used for the image pick up. Essentially, higher optical resolution requires shorter wavelength and larger numerical aperture. Large numerical aperture, however, is disadvantageous in its requirement of more precise optical alignment. Poor optical alignment in the pickup of an image for large numerical aperture lens results in poor image resolution. This is because that the focal plane can not be adjusted to its best location. One solution in helping the precision alignment of the access light beam in the optical disks for data storage is to reduce the thickness of the optical disk transparent substrate as thin as possible.

Among the several high-density digital video optical disk standards under development, for example, the Multimedia Compact Disc (MMCD) and the Super Disc (SD) which are integrated into using an optical disk substrate having a thickness of 0.6 mm, utilizing an objective lens having a numerical aperture of 0.6, and illumination data image with a laser light having a wavelength of 650 nm or 635 nm. In comparison, the conventional CD audio (CD-ROM as well) is standardized at a disk substrate of 1.2 mm thickness, using the objective lens for its optical pick-up head having a numerical aperture of 0.45, and illuminating with a laser having a wavelength of 780 nm.

Thus, to construct an optical disk drive that is able to handle data access of, that is, compatible to, both the conventional CD-ROM and the new SD discs, an optical pick-up head capable of handling both the above two optical specifications must be used. In other words, a dual-focus objective lens for the pick-up head of such an optical disk drive must be developed to allow for the use of either the conventional CD-ROM or the new SD disk on the same optical disk drive device.

To facilitate such dual-focus capability for a single optical pick-up head, several known techniques have been proposed so far. Among the three most noticeable proposals, one is a technique that employs a sophisticated servo mechanism to mechanically switch between two objective lenses each suitable for one optical standard. A second technique employs holographic optical element (HOE) technology, which combines the function of a polarization beam splitter and a cylindrical lens into one element for managing to adapt to two different optical standards. The third technique, on the other hand, employs the objective lens holographic dual-focusing for the same purpose. These prior art method and devices are briefly described as follows.

Refer to FIG. 1 of the accompanying drawing of the present invention. FIG. 1 is a perspective view that schematically shows a prior art double objective lens mechanism to implement dual-focus optical pick-up head access for an optical disk drive device. As is seen in the drawing, two objective lenses 12 and 14 are employed for the optical pick-up head of the device to be able to handle two different types of optical disks. For example, the objective lens 12 may be one that is shaped for the access of the CD's of the SD standard that requires larger numerical aperture and shorter focal length. The other objective lens 14, on the other hand, may be one that is shaped for the access of the conventional CD-ROM disks that requires relatively smaller numerical aperture and a longer focal length. A servo mechanism not shown in the drawing is necessary for the positioning of each of the two objective lenses 12 and 14 into the correct spot and alignment for the successful access of data on each of the two different types of CD's. Although the use of two different objective lenses alternatively switchable into the same optical path will enjoy the higher optical energy efficiency as one single light source does not need to be split in two optical paths for each of the two objective lenses, however, disadvantages are also obvious.

First, the precision lens switching servo mechanism is necessary since the CD standard requires the alignment in the micrometer range. The servo mechanism must maintain positional in addition to direction alignment precision. This adds to costs of the disk drive device to be mass produced. Secondly, two, instead of one, objective lenses are required for one disk drive device. A factor also contributes to the increase of manufacturing costs.

FIGS. 2A and 2B show the use of an HOE 22 in addition to the objective lens 24 that schematically depicts the passages of the zero- and the first-order lights respectively for facilitating dual focuses in one optical path employing one single objective lens, as compared to the double-lens mechanical implementation. As is seen in the drawing, this HOE multi-focusing scheme employs an HOE lens 22 that is placed in the illuminating light path before the conventional objective lens 24 so that the zero-order light 26 light that passes through the grating of the HOE lens 22 may be focused by the objective lens 24 at the depth in the optical disk 28 where the SD data image layer is. On the other hand, the first-order light 27 of the diffraction as a result of the presence of the HOE lens 22 will be slightly diverged when it leaves the HOE lens 22 which is then focused by the objective lens 24 at the depth in the optical disk 29 where the CD data image layer is. FIG. 2C shows an enlarged portion of the cross-sectional view of the HOE lens 22. An HOE relies on the slit-grating for achieving diffraction. In principle, multiple levels of step-shaped slit grating is advantageous for maintaining higher optical path light energy efficiency. In the depict example of FIG. 2C, a total of four slit-grating levels are used as is seen in the drawing.

Essentially, this HOE multi-focusing scheme makes use of the fact that the first-order light produced by the diffraction in the holographic grating will have been diverged, while the zero-order light will not. Two focal lengths using one light source and one objective lens assembly is therefore possible, with very high image resolution achievable in its zero-order light mode. However, disadvantages of this scheme are also obvious.

First, HOE lens is relatively difficult to manufacture as it involves the making of diffraction gratings for lenses. Although four-level stepped grating can achieve reasonable imaging results, they still add considerably to the cost of the lens system for the optical disk drive devices. Secondly, the optical energy efficiency is still reduced with the use of HOE multi-focusing schemes. About 24% lost is inevitable for a grating having four stepped levels as depicted in FIG. 2C.

FIG. 3A is a cross-sectional view that schematically shows the prior art implementation of an objective lens holographic multi-focusing scheme. This scheme can be considered as simply using a combination of the HOE lens 22 and the objective lens 24 of that of FIGS. 2A and 2B. The optically-combined holographic dual-focusing objective lens 30, based on the same working principle as that of the lenses 22 and 24 of FIGS. 2A and 2B, achieves dual focuses in the substrate of the both the CD and SD disks, as is seen in the drawing.

FIG. 3B shows an example of the one-beam optical pick-up head that makes use of the HOE multi-focusing scheme to facilitate dual-focusing. A laser beam is generated by the laser diode 32, reflected by the beam splitter 34, and focused by the holographic dual-focusing objective lens 36 on the data image layer of the SD optical disk 38, if present, with the zero-order light thereof On the other hand, the diffracted first-order portion of the laser beam will be similarly focused on the data image layer of the CD optical disk 39, if it is present. In either case, the image beam that is reflected by the data image layer of either disk 38 or 39 will pass through the beam splitter 34 and be detected by the photo detector 35.

Holographic dual-focusing objective lenses which, as described above, is a single optically-combined objective and HOE lens, may well be utilized as the direct replacement for the objective lens in the optical pick-up heads of conventional CD-compatible optical disk drive devices. No other portions in these CD drives will have to be altered to accommodate this HOE technology lens, however, such drive devices still suffer several disadvantages.

Firstly, HOE technology lens, as described above, is difficult and therefore costly to manufacture. And, second, HOE lens suffers deficiencies in optical energy loses of about 24%.

SUMMARY OF THE INVENTION

It is therefore the principle object of the present invention to provide an objective lens for optical pick-up head of optical disk drive devices capable of simplifying the focus switching mechanism.

It is another object of the present invention to provide an objective lens for optical pick-up head of optical disk drive devices suitable for easy and low cost manufacturing.

It is yet another object of the present invention to provide an objective lens for optical pick-up head of optical disk drive devices featuring substantially zero energy loss for achieving dual-focusing utilizing one single lens or a combination of two simple lenses.

The present invention achieves the above identified objects by providing an objective lens for an optical disk drive device. The objective lens comprises four portions each having a aspherical surface for focusing a light beam of a designated wavelength to a designated focal point. The first portion has a first aspherical surface that focuses the light beam to a first focal point. The second portion has a second aspherical surface that focuses the light beam to a second focal point. The third portion has a third aspherical surface featuring the same surface curvature characteristics and aspherical coefficients as that of the first aspherical surface and focuses the light beam to the first focal point. And, the fourth portion has a fourth aspherical surface featuring the same surface curvature characteristics and aspherical coefficients as that of the second aspherical surface and focuses the light beam to the second focal point. The objective lens can be made as a single-piece lens that suffers no energy loss for either focusing.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which.

DESCRIPTION OF THE PREFERRED EMBODIMENT

Before proceeding with the detailed description of the preferred embodiments of the present invention, the basic equation for describing aspherical lenses in a Cartesian coordinate system is outlined mathematically as follows:

$$Z = \frac{ch^2}{1 + \sqrt{1-(1+k)c^2h^2}} + Ah^4 + Bh^6 + Ch^8 + Dh^{10} + \\ Eh^{12} + Fh^{14} + Gh^{16} + Hh^{18} + Jh^{20} \quad (1)$$

wherein z represents the position on the z axis, c is the curvature of the aspherical surface, k is the conic coefficient, in which k=0 indicates a sphere, $-1<k<0$ indicates an ellipsoid, k=−1 indicates a paraboloid, k<−1 indicates a hyperboloid, A, B, C, D, E, F, G, H and J are, respectively, 4, 6, 8, 10, 12, 14, 16, 18 and 20th-order deformation coefficients, and h is the distance on the x-y plane from the origin, i.e., $h^2 = X^2 + Y^2$.

In the above equation (1), the surface curvature c, conic k, and deformation A, B, C, D, E, F, G, H and J coefficients when combined are the characteristic parameters that uniquely determine the surface feature of a aspherical lens. These coefficients are therefore generally referred to as aspherical characteristics coefficients. The focus of a aspherical lens for a light source of specific wave length is determined by parameters including those describing the material used for the making of the lens, the numerical aperture, the surface aspherical characteristic coefficients, as well as the thickness of the lens, etc.

Figure 4:
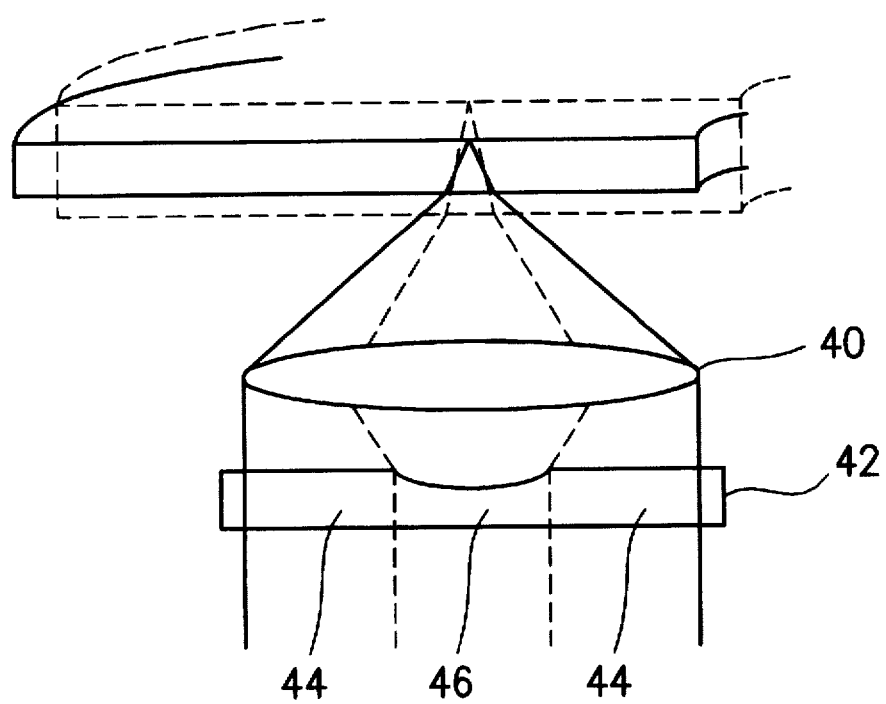
FIG. 4 schematically shows a dual-focus objective lens assembly for the optical pick-up head of an optical disk drive device in accordance with a preferred embodiment of the present invention.

Refer to FIG. 4 of the drawing. A dual-focus objective lens assembly for the optical pick-up head of an optical disk drive device in accordance with a preferred embodiment of the present invention is shown. The cross-sectional view revealing the combination of a double-convex lens 40 and a single concave lens 42 to comprise the lens assembly that has two focal points in the different depth into the transparent substrate of the optical disk. The convex and concave surfaces of the lenses 40 and 42 respectively are aspherical surfaces.

Essentially, the component of the illuminating light having a designated wavelength that first beams through the double-flat portion 44 of lens 42 and then converged by the double-convex lens 40 will be focused on the SD data image layer that is 0.6 mm in depth in the optical disk substrate. This optical path is schematically outlined by the solid lines. By contrast, the component of the illuminating light that first beams through the single-concave portion 46 of lens 42 will also be converged by the subsequent double-convex lens 40 and focuses on the CD data image layer that is 1.2 mm in depth in the optical disk substrate, as schematically outlined by the optical path shown in phantom lines. This second component of the illuminating light results in a longer focal length than the first because the single-concave portion 46 of the lens 42 diverges the light before it is again converged by the subsequent double-convex lens 40. By proper selection of the curvatures of the aspherical surfaces of both the lenses 40 and 42, it is by no means difficult to have the two focuses fall respectively on the depths 0.6 and 1.2 mm inside the transparent substrate of the optical compact disc.

Figure 5:
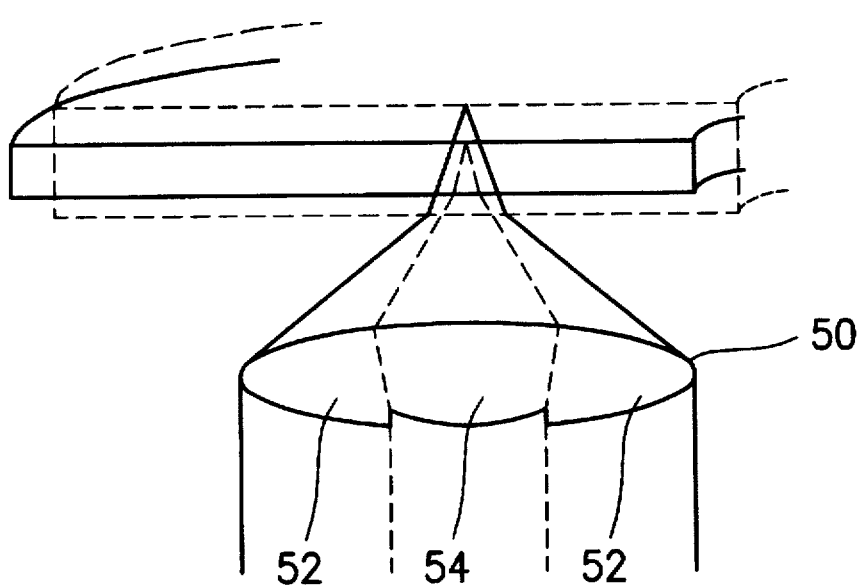
FIG. 5 schematically shows a dual-focus objective lens for the optical pick-up head of an optical disk drive device in accordance with another preferred embodiment of the present invention.

Refer next to FIG. 5. FIG. 5 schematically shows a dual-focus objective lens for the optical pick-up head of an optical disk drive device in accordance with another preferred embodiment of the present invention. The dual-focus objective lens 50 is essentially a single piece of lens that has two concentric portions of different surface curvatures as identified by portions 52 and 54 respectively. Both concentric portions feature aspherical surfaces essentially. As is seen in the drawing, it is assumed that the portion 54 has a surface curvature larger than that of portion 52.

In operation, the component of the illuminating light having a designated wavelength that beams through the portion 54 of lens 50 will be focused on the SD data image layer that is 0.6 mm in depth in the optical disk substrate. This optical path is schematically outlined by the phantom lines in the drawing. By contrast, the component of the illuminating light that beams through the portion 52 of lens 50 will be focuses on the CD data image layer that is 1.2 mm in depth in the optical disk substrate, as schematically outlined by the optical path shown in solid lines. This second component of the illuminating light results in a longer focal length than the first simply because the curvature of the portion 54 of lens 50 is larger than that of portion 52. As described above, by proper selection of the curvatures of the aspherical surfaces of both the portions 52 and 54, it is easily possible to have the two focuses fall respectively on the depths 0.6 and 1.2 mm inside the transparent substrate of the optical compact disc.

FIGS. 4 and 5 exemplify two design arrangements of the dual-focus objective lens for the optical pick-up head of an optical disk drive device in accordance with the preferred embodiments of the present invention. It is, however, necessary to indicate that since one single light source is used for the data access of two different specifications of compact discs, namely SD and CD standards in the described examples, it is preferable to use the shorter wavelength 650 nm or 635 nm for the SD specification.

The dual-focus objective lens of the present invention may feature better image focusing effectiveness as will be shown below.

A Gaussian beam with different degrees of truncation that is focused by a single-focus lens will be imaged into a spot on the focal plane having a size that may be determined in the following equation:

$$SPOT\_SIZE = 2 \times r = 2 \times C \times \frac{\lambda}{NA} \quad (2)$$

wherein

NA is the numerical aperture which equals to nSinθ (θ is the maximum focusing convergence angle and n is the reflection index), λ is the wavelength, and C is a coefficient related to the energy density of the Gaussian beam with different degrees of truncation that focuses on the spot on the focal plane; the larger the value of the C coefficient, the larger the size of focused spot will be.

TABLE 1

| $h^2$ | 0. | 0.693 | 1. | 1.2 | 1.5 | 2.0 | 3.0 | 4.5 | 8. |
|---|---|---|---|---|---|---|---|---|---|
| FWHM | 0.258 | 0.266 | 0.270 | 0.273 | 0.277 | 0.283 | 0.298 | 0.323 | 0.387 |
| $1/e^2$ | 0.409 | 0.424 | 0.431 | 0.435 | 0.442 | 0.455 | 0.482 | 0.526 | 0.643 |
| First-Order Diffraction Ring | 0.610 | 0.641 | 0.656 | 0.664 | 0.680 | 0.710 | 0.780 | 0.925 | none | wherein, h is the truncation plane parameter for Gaussian beam before passing through the objective lens, ($h^2=0$ indicates an uniform illumination, $h^2=0.693$ indicates half value of its Gussian intensity distribution)

FWHM is when after passing through the objective lens, the energy of the focused spot image becomes ½.

$1/e^2$ is when after passing through the objective lens, the energy of the focused spot image becomes $1/e^2$ (14%), and First-order diffraction ring is when after passing through the objective lens, when the first-order diffraction is generated.

From the above-outlined Equation (2) and Table 1, it is obvious that the spot size and the illumination intensity of the spot with that size are dependent. For applications such in optical pick-up head for optical disk drive device, it is apparently a better situation to have a smaller spot size based on the same illumination intensity, or optical energy.

Figure 6A:
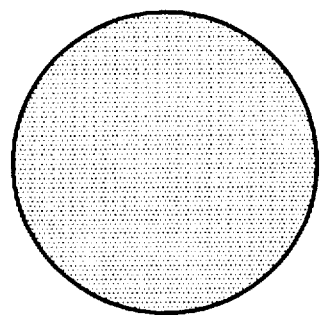
FIG. 6A is the plan view of a single-focus aspherical objective lens.
Figure 6B:
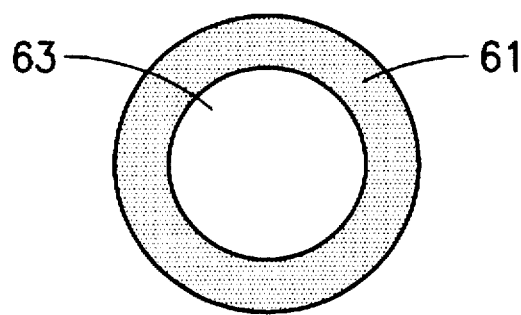
FIG. 6B is the plan view of a dual-focus objective lens comprising two concentric aspherical lenses.
Figure 6C:
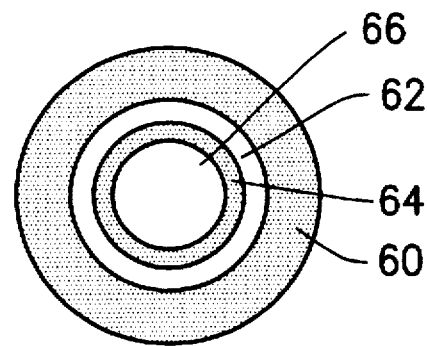
FIG. 6C is the plan view of a dual focus aspherical objective lens in accordance with a preferred embodiment of the present invention.

Refer next to FIG. 6A of the drawing. A plan view of a single-focus aspherical objective lens is shown schematically. This lens is designed to focus on the SD data image layer having the relatively shorter focal length. FIG. 6B is the plan view of a dual-focus objective lens essentially comprising two concentric aspherical lenses. Moreover, FIG. 6C is the plan view of a dual focus aspherical objective lens in accordance with a preferred embodiment of the present invention. The lens shown in FIG. 6B is similar to the one already described above with reference to FIG. 5. The single-piece lens shown in FIG. 6C, however, is more complicated than the double-portion lens of FIG. 5. In addition to the portions 60 and 62, it further comprises two more aspherical surface portions 64 and 66 than that of FIG. 5. A total of four aspherical surface portions are combined to make the objective lens for the optical pick-up head. From the plan view of FIG. 6C, it can be seen that all four portions appear as concentric circles.

Based on proper design calculations for the surface curvature of the four different portions 60, 62, 64 and 66 respectively of the single-lens of FIG. 6C, it is possible to assign the same aspherical surface center, thickness and numerical aperture for both portions 60 and 64, and the same aspherical surface curvature, thickness and numerical aperture for both portions 62 and 66. This allows the four portions 60, 62, 64 and 66 to be utilized to construct a lens with two different focal length. Essentially, the edge portion 60 and the inner portion 64 have the same shorter focal length of 0.6 mm suitable for the access to the SD disks, and with the numerical aperture of 0.6. On the other hand, the second portion 62 from the edge and the inner most portion 66 are shaped to have the same longer focal length of 1.2 mm suitable for the access to the CD disks, and with the numerical aperture of between 0.38 and 0.43. The reason to maintain a range of numerical aperture for the portions 62 and 64 is to allow for better effect utilizing an illuminating light of shorter wavelength.

A comparison in terms of the focused optical intensity of the light beams passing through the entire lens of FIG. 6A, through portion 61 of the length of FIG. 6B, or through the portions 60 and 64 of the lens of FIG. 6C respectively is outlined in both FIG. 7 and Table 2 below.

TABLE 2

| | Lens of FIG. 6A | Portion 61 of Lens of FIG. 6B | Portions 60 an 64 of Lens of FIG. 6C |
|---|---|---|---|
| FWHM | 0.544 | 0.432 | 0.470 |
| $1/e^2$ | 0.870 | 0.670 | 0.736 |
| First-Order Diffraction Ring | 0.8% | 13% | 6.22% |

Figure 7:
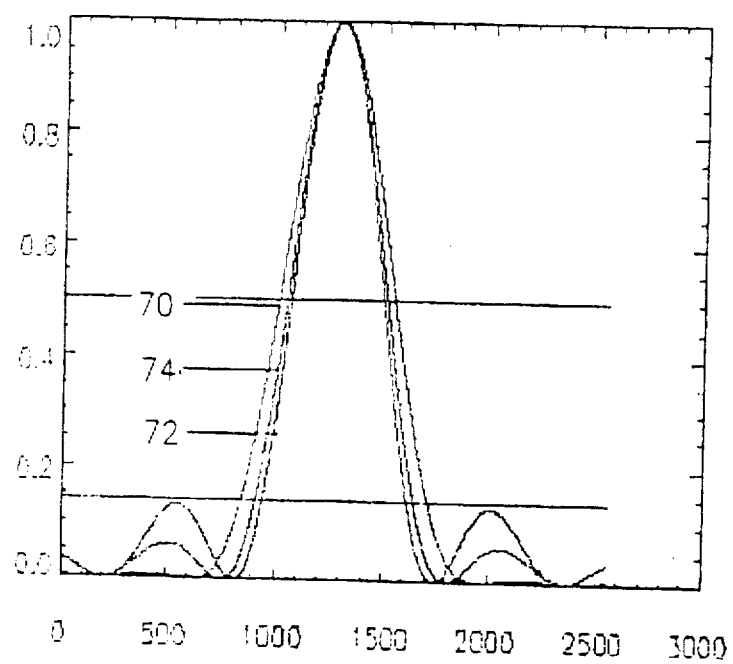
FIG. 7 shows the Airy patterns for the diffraction characteristics of the lens portions in FIGS. 6A, 6B and 6C respectively.

Refer to FIG. 7 and Table 2 simultaneously. As can be observed in both FIG. 7 and Table 2 above, light passing through the single-focus objective lens of FIG. 6A is characterized by the absence of a first-order diffraction, as is clearly seen in the Airy pattern 70 of FIG. 7. This focusing features the largest spot size based on the same optical energy intensity. On the other hand, the Airy pattern 72 shown in FIG. 7 represents the diffraction characteristic of the edge portion 61 of the lens of FIG. 6B. This equivalent lens has a smallest spot size but with an excessively large diffraction ring. The diffraction ring is too large to be barely acceptable for practical use. Finally, the Airy pattern 74 shown in FIG. 7 represents the diffraction characteristic of the edge portion 60 and the inner portion 64 of the lens of FIG. 6C. This equivalent lens has a spot size smaller than that of the lens of FIG. 6A when the energy intensity is the same. The diffraction ring is also smaller.

Table 3 then lists the size ratio of the illuminated spot sizes formed by focusing via the lens portions with longer and shorter focal length as outlined in FIGS. 6A to 6C. As is seen in the table, minor changes to the diameters of the long and short length portions in the single lens will place only minor effect on the change of photo intensity and spot size for the light portion that passes through the lens portion having the shorter equivalent of the focal length. The major governing factor, instead, is the total number of discrete portion that make up the long and short focal length for the single-piece lens in question. In general, the more the total number of discrete portion, the better the imaging result will be.

TABLE 3

| | FIG. 6A | FIG. 6B | FIG. 6C | |
|---|---|---|---|---|
| Shading Region | none. | 0.0–2.62 mm | 0.0–3.0 mm | 2.62–2.0 mm 0.0–1.5 mm | 3.0–2.0 mm 0.0–1.5 mm |

TABLE 3-continued

|  | FIG. 6A | | FIG. 6B | | FIG. 6C |
| --- | --- | --- | --- | --- | --- |
| FWHM | 0.544 | 0.432 | 0.412 | 0.470 | 0.460 |
| $1/e^2$ | 0.870 | 0.670 | 0.636 | 0.736 | 0.722 |
| First-Order Diffraction Ring | 0.8% | 13% | 14.6% | 6.22% | 5.04% | wherein Table 3, the "shading region" field represents the diametric range in the long focal length portion of the lens that has an equivalent effectiveness of masking for the lens portion of shorter focal length.

Figure 8A:
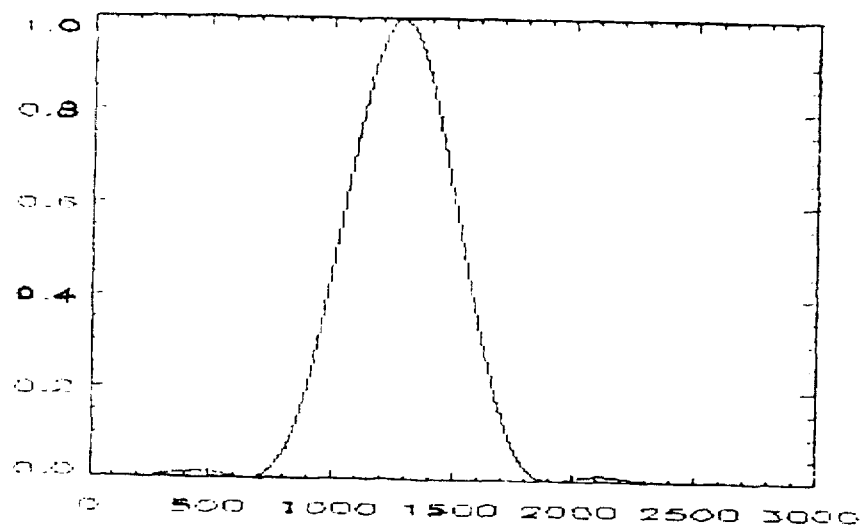
FIGS. 8A and 8B shows the Airy patterns for the lens portions of FIGS. 6B and 6C respectively.
Figure 8B:
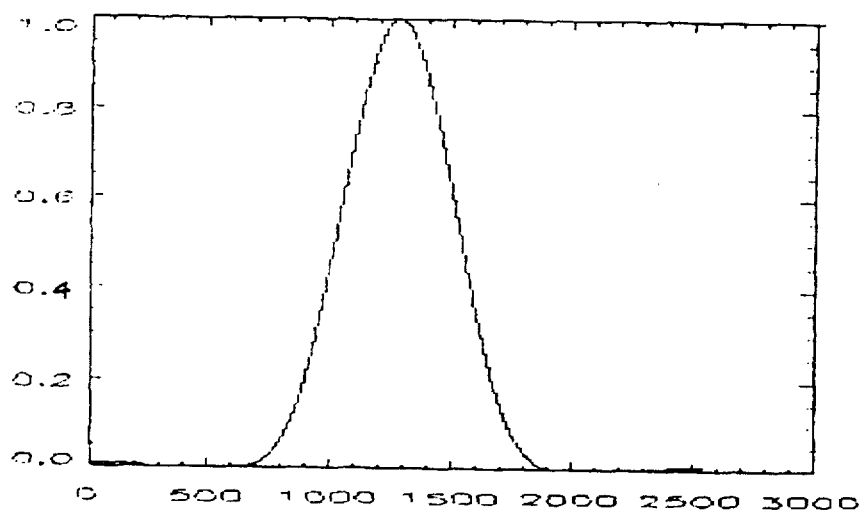

When an illuminating light is beamed through the lens portions having the longer focal length in FIGS. 6B and 6C, namely portion 63 in FIG. 6B and portions 62 and 64 in FIG. 6C, the parameters concerning the optical intensity and the spot size are outlined in Table 4 below. A corresponding Airy pattern for both the lens portions in FIGS. 6B and 6C are shown respectively in FIGS. 8A and 8B. An examination in FIGS. 8A and 8B reveals the fact that no change will be effected in both the photo intensity and the spot size if the diameter ranges of the lens portions for both the short and long focal length ones are subjected to minor adjustments. No first-order diffraction light is barely observable in this configuration.

TABLE 4

|  | FIG. 6B | | FIG. 6C | |
| --- | --- | --- | --- | --- |
| Shading Region | none. | | 1.5–2.0 mm | |
| Objective Lens Parameters | NA = 0.38 D = 2.62 mm | NA = 0.43 D = 2.89 mm | NA = 0.38 D = 2.62 mm | NA = 0.43 D = 2.89 mm |
| FWHM | 0.264 | 0.265 | 0.263 | 0.258 |
| $1/e^2$ | 0.419 | 0.422 | 0.422 | 0.412 |
| First-Order Diffraction Ring | 1.34% | 1.26% | 0.1% | 0.4% | wherein the shading region field represents the diametric range in the short focal length portion of the lens that has an equivalent effectiveness of masking for the lens portion of longer focal length, and D is the diameter for the long focal length portion of the lens.

Figure 9A:
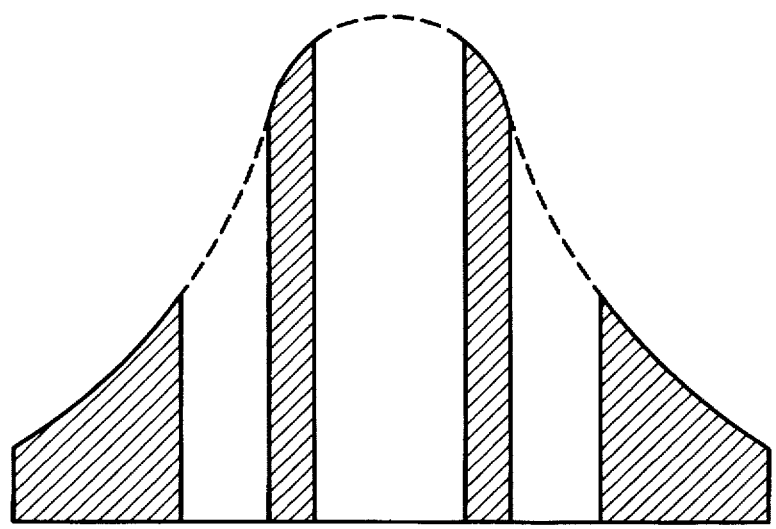
FIG. 9A schematically shows the optical energy intensity distribution as a function of the lens diameter for the shorter focal length portion of the lens in FIG. 6C.
Figure 9B:
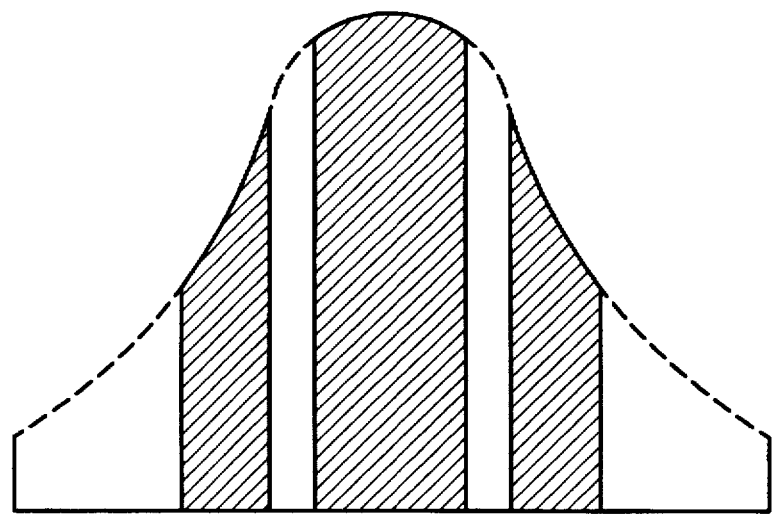
FIG. 9B schematically shows the optical energy intensity distribution as a function of the lens diameter for the longer focal length portion of the lens in FIG. 6C.

Next, comparing FIG. 9A to 9B. FIG. 9A schematically shows the optical energy intensity distribution as a function of the diameter for the shorter focal length portion of the lens in FIG. 6C, while FIG. 9B shows the distribution for the longer focal length portion of the lens in FIG. 6C. The shaded portions in both FIG. 9A and 9B represent the portions where illuminating light is focuses into the focal planed of the shorter and longer lengths respectively.

The comparison reveals the fact that the two energy distribution profiles in FIGS. 9A and 9B respectively can be combined together to obtain one single smooth profile. This reflects the fact that the optical energy intensity as focused over the focal plane of the lens of FIG. 6C, the shorter and longer focal length portions inclusive, are substantially cleanly divided between the two sets of portions. In other words, the shorter and longer focal length portions of the lens has complementary consumption of the optical energy as provided by the illuminating light beam. No optical energy is lost when the lens device is utilized to split the optical energy among the two focal portions of the same single-piece lens. Recall that the conventional HOE technology lenses will consume about 24% of the optical energy provided by the illuminating light source.

As person skilled in the art may well appreciate, the technique for the making of the dual-focus lens of the present invention as analyzed above to reveal their better characteristics than the prior art lenses is equally applicable to lens assemblies employing more than one piece of lens. For example, a lens assembly that includes one double-convex lens and a partially diverging lens will be able to achieve the same energy consumption-free dual-focus length provided that the relevant aspherical surfaces all acquire their respective proper curvatures. In fact, to simplify the matter, the use of one double-convex lens having a focal length equal to the shorter one of the two focuses required, plus a flat-surface lens having a portion acquiring the suitable diverging characteristics that can be combined with the first convergent lens to produce the longer one of the two focuses will comprise a good dual-focus lens assembly that is both easy and cheap to make.

Figure 10:
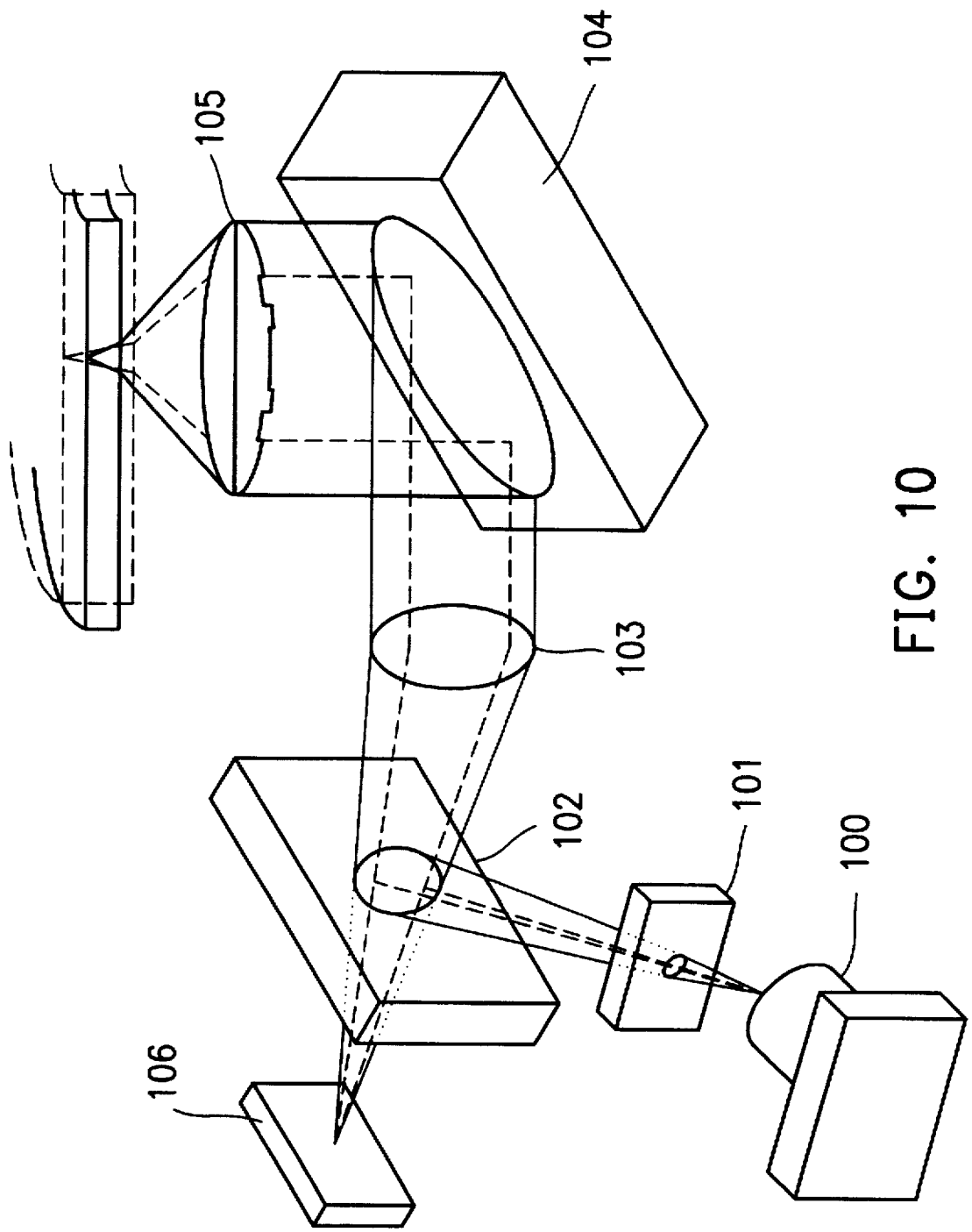
FIG. 10 is a perspective view schematically showing the arrangement of the optical pick-up head featuring the dual-focus objective lens in accordance with the preferred embodiment of the present invention.

FIG. 10 is a perspective view schematically showing the arrangement of the optical pick-up head featuring the dual-focus objective lens in accordance with the preferred embodiment of the present invention. A laser diode 100 is utilized as the light source generating a light beam that passes through a grating 101. The light beam is then reflected at the beam splitter 102 and propagates toward the folding mirror 104 via the collimator lens 103. The light beam is then focused by the dual-focus lens 105 of the present invention such as, for example, the lens described in FIG. 6C and focuses on the proper depth of either 0.6 or 1.2 mm into the substrate of the optical disk whose data is to be accessed. The reflected light, that is, if a data pot is present, is then returned via the lens 105, reflected by the folding mirror 104, then passes through the beam splitter 102, and is finally received by the photo detector 106.

The dual-focus objective lens embodying the present invention in FIG. 6C is also analyzed utilizing a computer software program that calculates the lens parameters including the aspherical surface characteristics, the thickness, etc., which are listed in Table 5 below. The dual-focus objective lens having the characteristics as outlined in Table 5 is well suitable for use in a optical pick-up head arrangement such as the one outlined in FIG. 10. Due to the fact that the four portions of the single-piece lens having four aspherical surfaces featured by different curvature characteristics and aspherical coefficients are formed at the incident surface of the lens, there will therefore be only one aspherical surface necessary at the emerging refracted surface of the lens. Table 5 also lists the different numerical apertures for the portions involved.

TABLE 5

|  |  | Portion 1 and 3 | Portion 2 and 4 | Portion 2 and 4 |
| --- | --- | --- | --- | --- |
|  | Numerical Aperture | 0.60 | 0.38 | 0.43 |
|  | Focus | 3.37 mm | 3.44 mm | 3.36 mm |
|  | Diameter | 4.04 mm | 2.62 mm | 2.89 mm |
|  | Thickness | 2.60 mm | 2.50 mm | 2.35 mm |
| Incident Surface | 1/Curvature | 2.17000 | 2.24668 | 2.19390 |
|  | Conic Coefficient | −1.041422 | −1.0009525 | −0.986959 |
|  | 4th-Order Deformation Coefficient | 0.682912E-2 | 0.654792E-2 | 0.676608E-2 |
|  | 6th-Order Deformation Coefficient | 0.185375E-3 | 0.125891E-3 | 0.135219E-2 |
|  | 8th-Order Deformation Coefficient | 0.123534E-4 | 0.255350E-4 | 0.300778E-4 |
|  | 10th-Order | −0.198067E-5 | −0.292505E-5 | −0.371438E-5 |

TABLE 5-continued

|  |  | Portion 1 and 3 | Portion 2 and 4 | Portion 2 and 4 |
|---|---|---|---|---|
|  | Deformation Coefficient |  |  |  |
| Refracted Surface | 1/Curvature | −6.73803 |  |  |
|  | Conic Coefficient | −47.796398 |  |  |
|  | 4th-Order Deformation Coefficient | 0.344686E-2 |  |  |
|  | 6th-Order Deformation Coefficient | −0.109217E-2 |  |  |
|  | 8th-Order Deformation Coefficient | 0.180174E-3 |  |  |
|  | 10th-Order Deformation Coefficient | −0.109326E-4 |  |  |

Figure 1:
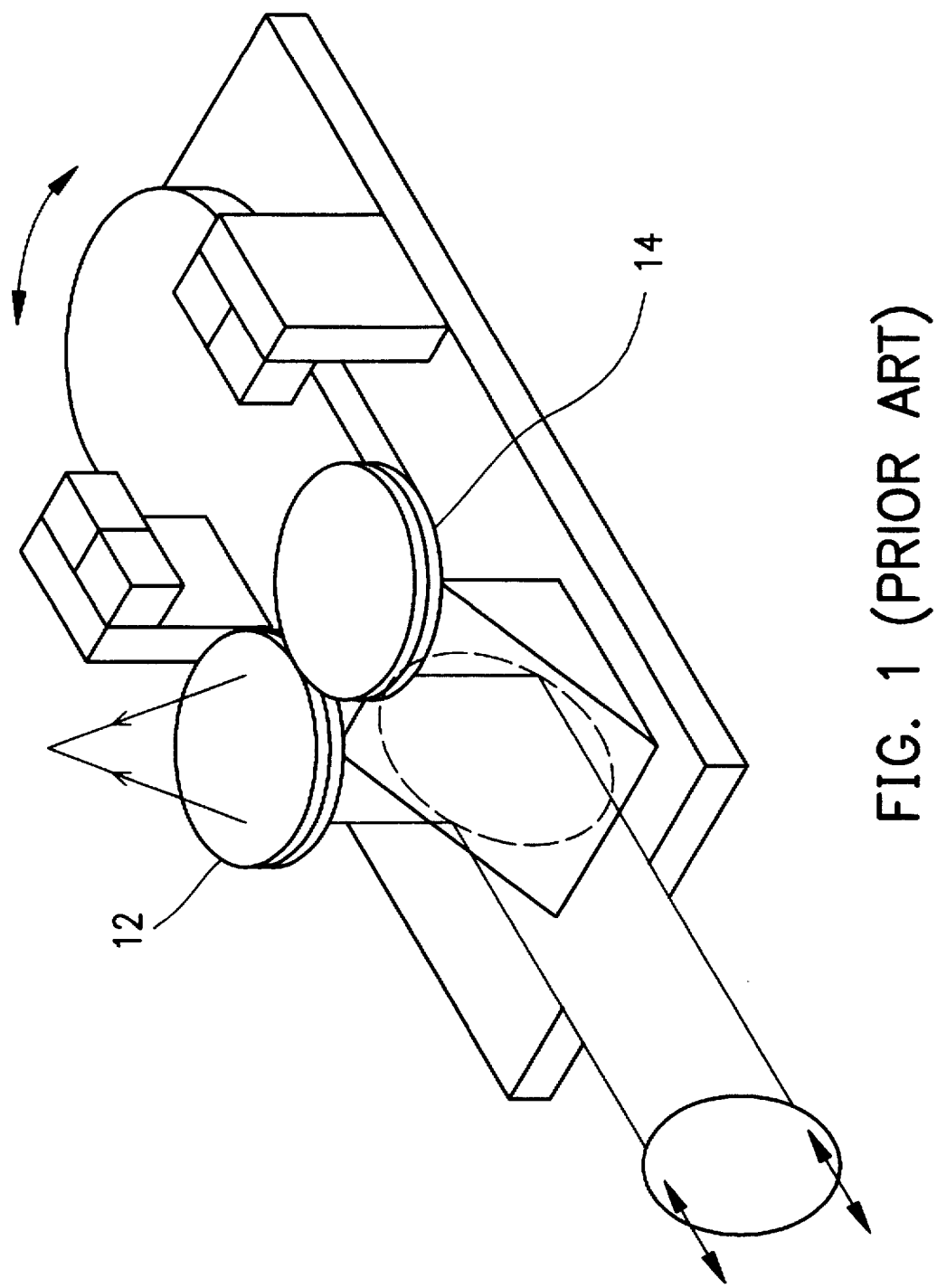
FIG. 1 is a perspective view schematically showing a prior art double-objective lens mechanism that implements dual-focus optical pick-up head access.
Figure 2A:
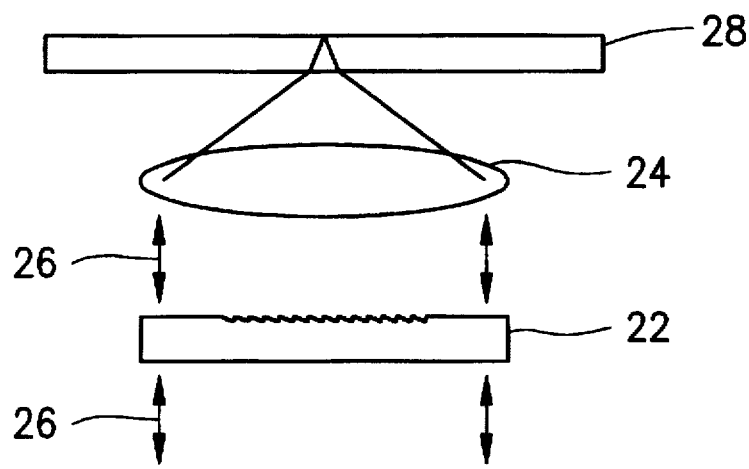
FIGS. 2A and 2B schematically show a prior art utilizing an HOE lens in addition to an objective lens in the zero- and first-order light modes for facilitating dual focuses in one optical path employing one single objective lens.
Figure 2B:
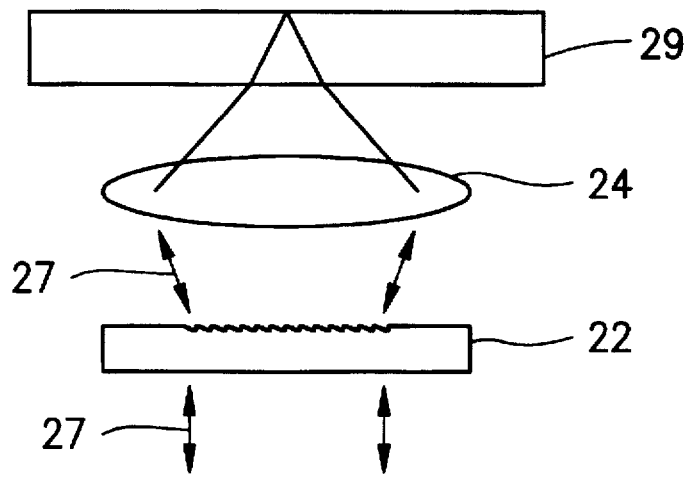
Figure 2C:
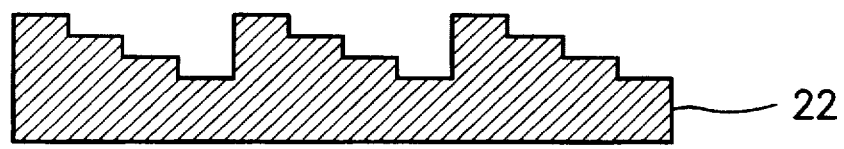
FIG. 2C shows an enlarged portion of the cross-sectional view of the HOE lens of FIGS. 2A and 2B.
Figure 3A:
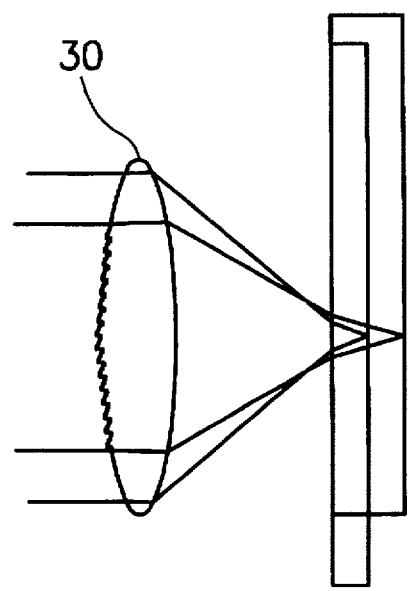
FIG. 3A is a cross-sectional view schematically showing the prior art implementation of an objective lens holographic dual-focusing.
Figure 3B:
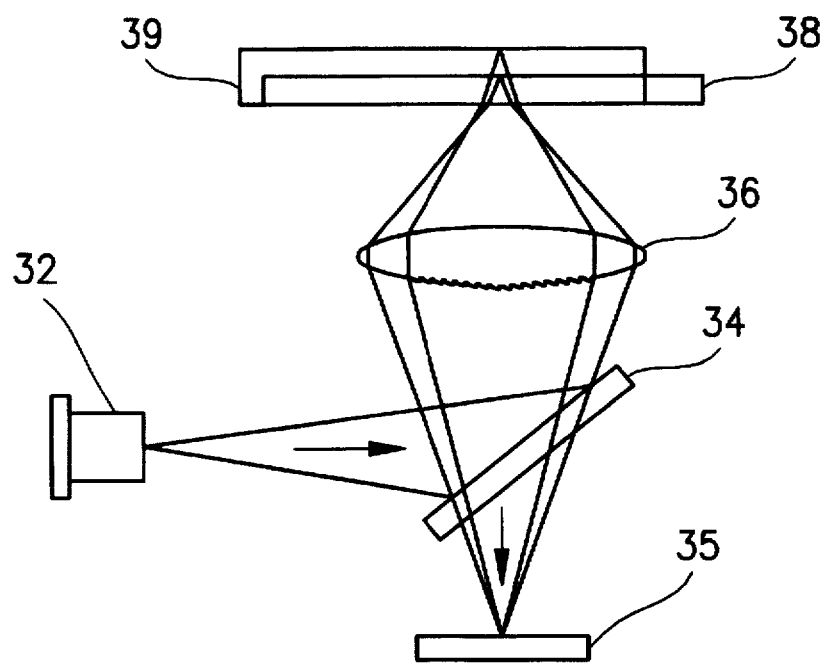
FIG. 3B schematically shows a prior art one-beam optical pick-up head that makes use of the HOE dual-focusing scheme to facilitate dual-focusing.
Figure 11:
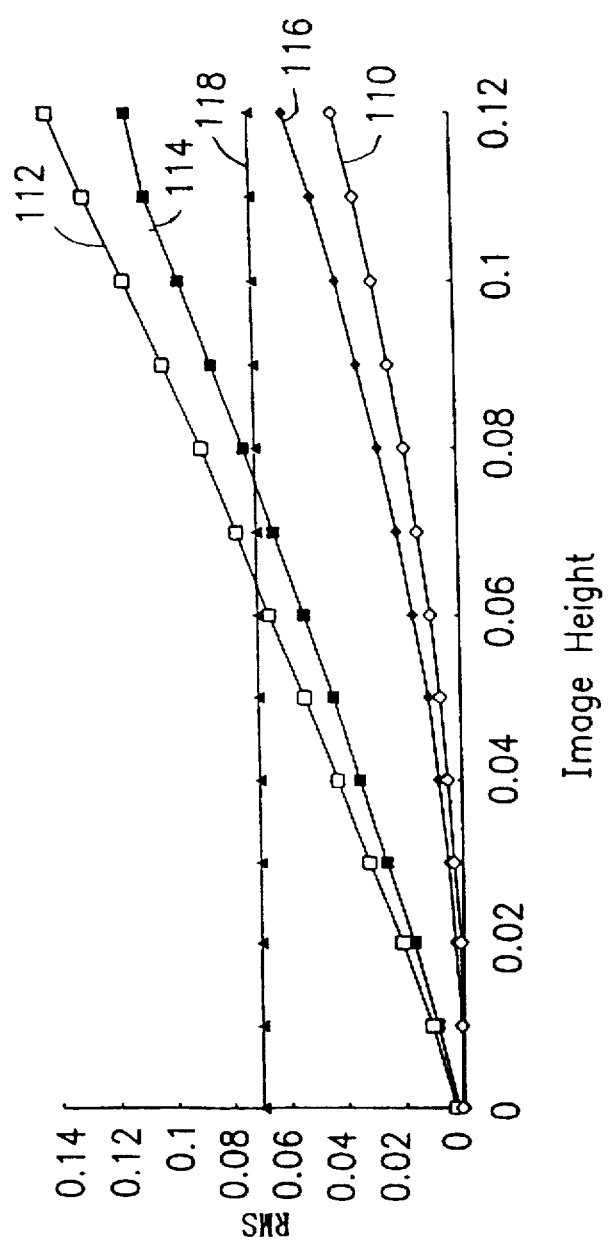
FIG. 11 shows the relationship between the image height against the infected wavefront imaging error for a number of different type of objective lens assemblies.

Refer next to FIG. 11 of the drawing. A relationship between the image height against the infected wavefront imaging error for a number of different type of objective lens assemblies are shown in several characteristic curves therein. The axis of abscissa represents the image height and the axis of ordinate represents the wavefront imaging error infected. The curve 110 is the characteristics for single-lens. Single-lens systems can tolerate the greatest amount of assembling error, or, in other words, based on the same level of assembling error, single-lens systems results in the smallest incurred wavefront imaging error. An objective lens made to the characteristic values listed in Table 5 above, the one identified by reference numeral 116, enjoys a second tolerance value. Another objective lens made by the HOE technology (as shown in FIG. 2B), the one identified by reference numeral 114, has a even worse value. A lens assembly requiring two pieces of lens, namely the one identified by 112, has the worst characteristics. Horizontal line 118 in FIG. 11 represents the projected tolerable wavefront imaging error for an objective lens design. It is evident that the dual-focal lens of the present invention is as superior as that of a single-focal lens to allow for up to 0.12 mm of assembling tolerance.

As persons skilled in this art may well appreciate, the present invention is not limited to the use of a single-piece objective lens having four portions of different aspherical surfaces. Nor is the present invention constrained in the concentric configuration for multiple portions of the aspherical surfaces in one-piece of lens. More portions of different aspherical surfaces featuring two different focal lengths with non-concentric arrangements are also possible and should be deemed to be within the scope of the disclosure of the present invention.

Thus, the single-piece dual-focus objective lens of the present invention is characterized by at least the following obvious advantages over the prior art multi-lens assemblies.

First of all, the dual-focus objective lens of the present invention eliminates the need for a complicated mechanical lens switching mechanism so that the entire disk drive device may be made simple that is easy to manufacture.

Secondly, the energy loss in the conventional HOE lens is prevented.

Thirdly, the aspherical surfaces of the lens of the present invention is much easier and cheaper to manufacture than the HOE element.

And, finally, the dual-focus lens of the present invention has a reduced spot size with increased numerical aperture, a factor increasing the data image capability of the optical pick-up head making use of the lens of the present invention.

While the invention has been described by way of examples and in terms of preferred embodiments, it is to be understood that the invention need not be limited to the disclosed embodiments. On the contrary, it is intended to cover various modifications and similar arrangements included within the spirit and scope of the appended claims.

What is claimed is:

1. An objective lens comprising:

a first portion having a first aspherical surface with a given surface curvature characteristic and aspherical coefficient, and focusing a light beam having a designated wavelength to a first focal point;

a second portion having a second aspherical surface with another given surface curvature characteristic and another aspherical coefficient, and focusing said light beam with designated wavelength to a second focal point;

a third portion having a third aspherical surface having substantially the same given surface curvature characteristics and aspherical coefficients as that of said first aspherical surface and focusing said light beam with the designated wavelength to said first focal point;

a fourth portion having a fourth aspherical surface having substantially the same another given surface curvature characteristic and another aspherical coefficient as that of said second aspherical surface and focusing and light beam with designated wavelength to said second focal point;

wherein in a transparent substrate, said first focal point and said second focal point are spaced from one another at different depth; and wherein the first and third portions have substantially the same first thickness and the second and fourth portions have substantially the same second thickness to facilitate a single lens construction having two different focal lengths.

2. The objective lens of claim 1, wherein said first, second, third and fourth portions are concentric lens portions of said objective lens portions with said first portion arranged at the edge of said lens, said second portion inner next to said first portion, said third portion inner next to said second portion, and said fourth portion at the center of said objective lens.

3. The objective lens of claim 1, wherein said first, second, third and fourth portions are concentric lens portions of said objective lens portions with said fourth portion arranged at the edge of said lens, said third portion inner next to said fourth portion, said second portion inner next to said third portion, and said first portion at the center of said objective lens.

4. The objective lens of claim 16, wherein the surface curvature characteristics and aspherical coefficients include curvature, conic coefficient, and the fourth-, sixth-, eighth- and tenth-order deformation coefficients.

5. The objective lens of claim 1, wherein said designated wavelength is 650 nm.

6. The objective lens of claim 1, wherein said designated wavelength is 635 nm.

7. The objective lens of claim 1, wherein the numerical apertures of said first and third aspherical surfaces are about 0.6.

8. The objective lens of claim 1, wherein the numerical apertures of said second and fourth aspherical surfaces are about 0.35 to 0.43.

9. An objective lens assembly comprising:

a convex convergent lens; and a regionally concave divergent lens;

wherein said regionally concave divergent lens includes:

a first portion having a first aspherical surface with a given surface curvature characteristic and aspherical coefficient and focusing a light beam having a designated wavelength to a first focal point when combined with said convex convergent lens;

a second portion having a second aspherical surface with another given surface curvature characteristic and aspherical coefficient; and focusing said light beam with designated wavelength to a second focal point when combined with said convex convergent lens;

a third portion having a third aspherical surface having substantially the same surface curvature characteristics and aspherical coefficients as that of said first aspherical surface and focusing said light beam with designated wavelength to said first focal point when combined with said convex convergent lens; and a fourth portion having a fourth aspherical surface having substantially the same another given surface curvature characteristics and aspherical coefficients as that of said second aspherical surface and focusing said light beam with designated wavelength to said second focal point when combined with said convex convergent lens.

10. The objective lens assembly of claim 9, wherein said first, second, third and fourth portions are concentric lens portions of said regionally concave divergent lens portions with said first portion arranged at the edge of said lens, said second portion inner next to said first portion, said third portion inner next to said second portion, and said fourth portion at the center of said objective lens.

11. The objective lens assembly of claim 9, wherein said first, second, third and fourth portions are concentric lens portions of said regionally concave divergent lens portions with said fourth portion arranged at the edge of said lens, said third portion inner next to said fourth portion, said second portion inner next to said third portion, and said first portion at the center of said objective lens.

12. The objective lens assembly of claim 9, wherein said aspherical surface curvature characteristics include curvature, conic coefficient, and the fourth-, sixth-, eighth- and tenth-order deformation coefficients.

13. The objective lens assembly of claim 9, wherein said designated wavelength is 650 nm.

14. The objective lens assembly of claim 9, wherein said designated wavelength is 635 nm.

15. The objective lens assembly of claim 9, wherein said first and third aspherical surface portions reduce to a flat plane.

16. A dual focus objective lens comprising:

a pair of spaced apart short focal length portions having substantially the same thickness and surface curvature characteristics for focusing a light beam having a designated wavelength to a focal point at a given depth in a transparent substrate; and a pair of spaced apart long focal length portions having substantially the thickness and surface curvature characteristics for focusing the light beam having a designated wavelength to another focal point at another given depth in said transparent substrate;

said pair of short focal length portions and said pair of long focal length portions having substantially different thicknesses and surface curvature characteristics to facilitate the focusing of the light to different focal points independently of one another.

17. A dual focus objective lens, comprising:

a double flat portion for helping to focus light having a designated wavelength to a focal point at a given depth in a transparent substrate;

a surface concave portion for diverging the light having said designated wavelength to help focus it to another focal point at another given depth in said transparent substrate; and a double convex portion for converging the light having said designated wavelength passed by said double flat portion to said focal point at said given depth and for converging the light having said designated wavelength passed by said single concave portion to said another focal point at said another given depth in said transparent substrate.

18. A dual focus objective lens according to claim 17 wherein said given depth is about 0.6 mm.

19. A dual focus objective lens according to claim 18 wherein said given depth is about 1.2 mm.

20. A dual focus objective lens comprising:

a first portion having a first surface curvature for focusing light having a designated wavelength to a focal point at a given depth in a transparent substrate;

a second portion having a second surface curvature for focus light having said designated wavelength to another focal point of another given depth in said transparent substrate; and said first surface curvature being substantially greater than second surface curvature.

* * * * *